(12) United States Patent
Habib et al.

(10) Patent No.: US 9,720,100 B2
(45) Date of Patent: Aug. 1, 2017

(54) METHOD FOR PROCESSING SIGNALS COLLECTED BY PIXELS OF A DETECTOR

(71) Applicant: COMMISSARIAT A L'ENERGIE ATOMIQUE ET AUX ENERGIES ALTERNATIVES, Paris (FR)

(72) Inventors: Amr Habib, Marseilles (FR); Marc Arques, Grenoble (FR)

(73) Assignees: COMMISSARIAT A L'ENERGIE ATOMIQUE ET AUX ENERGIES ALTERNATIVES, Paris (FR); TRIXELL, Moirans (FR)

( * ) Notice: Subject to any disclaimer, the term of this patent is extended or adjusted under 35 U.S.C. 154(b) by 0 days.

(21) Appl. No.: 15/032,574

(22) PCT Filed: Oct. 29, 2014

(86) PCT No.: PCT/EP2014/073194
§ 371 (c)(1),
(2) Date: Apr. 27, 2016

(87) PCT Pub. No.: WO2015/063134
PCT Pub. Date: May 7, 2015

(65) Prior Publication Data
US 2016/0259064 A1 Sep. 8, 2016

(30) Foreign Application Priority Data
Oct. 29, 2013 (FR) ...................... 13 60567

(51) Int. Cl.
*G01T 1/17* (2006.01)
*H04N 5/217* (2011.01)
(Continued)

(52) U.S. Cl.
CPC .............. *G01T 1/17* (2013.01); *G01T 1/2018* (2013.01); *H04N 5/2175* (2013.01);
(Continued)

(58) Field of Classification Search
CPC ......... G01T 1/17; G01T 1/2018; H04N 5/367; H04N 5/3675
See application file for complete search history.

(56) References Cited

U.S. PATENT DOCUMENTS 5,812,629 A 9/1998 Clauser
6,529,622 B1 * 3/2003 Pourjavid .............. H04N 5/367
250/370.09

(Continued)

FOREIGN PATENT DOCUMENTS

JP 2003-215248 A 7/2003

*Primary Examiner* — Mark R Gaworecki
(74) *Attorney, Agent, or Firm* — Baker & Hostetler LLP (57) ABSTRACT

A method for processing signals collected by pixels of a detector, each pixel being able to collect a signal under the effect of radiation to which the detector is subjected comprises: identifying a pixel, termed the affected pixel, generating a signal greater than a threshold, defining at least one adjacent pixel of the affected pixel, and, for each adjacent pixel: selecting a first comparison group associated with the affected pixel and a second comparison group associated with the adjacent pixel, the first and second comparison groups not comprising any pixel in common, comparing signals collected by each comparison group so as to determine the comparison group that has accumulated the most significant amount of signal.

10 Claims, 6 Drawing Sheets

(51) Int. Cl.
*H04N 5/32* (2006.01)
*H04N 5/321* (2006.01)
*H04N 5/325* (2006.01)
*H04N 5/359* (2011.01)
*G01T 1/20* (2006.01)

(52) U.S. Cl.
CPC ............ *H04N 5/321* (2013.01); *H04N 5/325* (2013.01); *H04N 5/3591* (2013.01)

(56) References Cited

U.S. PATENT DOCUMENTS

| | | |
|---|---|---|
| 7,667,205 B2 | 2/2010 | Ballabriga et al. |
| 2008/0251730 A1 | 10/2008 | Ballabriga et al. |
| 2010/0144291 A1 | 6/2010 | Stylianou et al. |
| 2012/0218447 A1* | 8/2012 | Furuya ................. H04N 5/3675 348/246 |

* cited by examiner

|   | 1 | 2 | 3 | 4 | 5 |
|---|---|---|---|---|---|
| a | 0 | 0 | 0 | 0 | 0 |
| b | 0 | 1 | 2 | 2 | 1 |
| c | 0 | 2 | 3 | 2 | 2 |
| d | 0 | 1 | 2 | 2 | 1 |
| e | 0 | 0 | 0 | 0 | 0 |

FIG.7a

|   | 1 | 2 | 3 | 4 | 5 |
|---|---|---|---|---|---|
| a | 0 | 0 | 0 | 0 | 0 |
| b | 0 | 1 | 2 | 2 | 1 |
| c | 0 | 2 | 3 | 2 | 2 |
| d | 0 | 1 | 2 | 2 | 1 |
| e | 0 | 0 | 0 | 0 | 0 |

FIG.7b

|   | 1 | 2 | 3 | 4 | 5 |
|---|---|---|---|---|---|
| a |   |   |   |   |   |
| b |   | 5 | 8 | 7 |   |
| c |   | 7 | 11 | 11 |   |
| d |   | 5 | 8 | 7 |   |
| e |   |   |   |   |   |

FIG.7c

|   | 1 | 2 | 3 | 4 | 5 |
|---|---|---|---|---|---|
| a | 0 | 0 | 0 | 0 | 0 |
| b | 0 | 1 | 2 | 2 | 1 |
| c | 0 | 2 | 3 | 2 | 2 |
| d | 0 | 1 | 2 | 2 | 1 |
| e | 0 | 0 | 0 | 0 | 0 |

FIG.8a

|   | 1 | 2 | 3 | 4 | 5 |
|---|---|---|---|---|---|
| a |   |   |   |   |   |
| b |   |   |   |   |   |
| c |   |   | 9 | 8 |   |
| d |   |   |   |   |   |
| e |   |   |   |   |   |

FIG.8b

METHOD FOR PROCESSING SIGNALS COLLECTED BY PIXELS OF A DETECTOR

CROSS-REFERENCE TO RELATED APPLICATIONS

This application is a National Stage of International patent application PCT/EP2014/073194, filed on Oct. 29, 2014, which claims priority to foreign French patent application No. FR 1360567, filed on Oct. 29, 2013, the disclosures of which are incorporated by reference in their entirety.

FIELD OF THE INVENTION

The invention relates to a method for processing signals collected by pixels of a detector.

The invention finds a particular application in a detector of electromagnetic radiation used for imaging. This type of detector comprises a large number of photosensitive points called pixels generally organized as a matrix or as a strip. A pixel represents the elementary sensitive element of the detector. Each pixel converts the electromagnetic radiation to which it is subjected into an electrical signal.

BACKGROUND

The electrical signals arising from the various pixels are collected during a phase of reading of the matrix and then digitized so as to be able to be processed and stored to form an image. The pixels are formed of a charge-collecting electrode, and of an electronic circuit for processing the electrical signal thus created. In a general manner, in each pixel, the collection electrode is associated with an electronic circuit, consisting for example of breakers, capacitor, resistors, and downstream of which is placed an actuator. The assembly consisting of the collection electrode and the electronic circuit makes it possible to generate electric charge and to collect the latter. Each pixel is linked to a reading circuit making it possible to read the amount of charge collected and to transfer it to a processing means. This type of radiation detector can be used for the imaging of ionizing radiations, and in particular X-rays or γ-rays, in the medical sector or that of non-destructive testing in the industrial sector, for the detection of radiological images.

In this case, the detector comprises a detector material, of scintillator or semi-conductor type, able to interact with incident radiation of X-ray or γ-ray type.

When the detector material is a semi-conductor, for example of the type CdTe, CdZnTe, $HgI_2$, an interaction of an incident photon in the detector generates the creation of charge carriers of electron-hole type. In this case, each pixel comprises a collection electrode able to collect some of the charge carriers resulting from the interaction. One speaks of a direct-conversion detector, since the charge collected by the collection electrodes is created by the interaction of the radiation to be detected in the detector material.

When the detector material is a scintillator, for example an inorganic scintillator of the type CsI, NaI, $LaBr_3$, an interaction of an incident photon generates a plurality of photons that are less energetic than the incident photon, whose wavelength is generally situated in the visible region. In this case, each pixel comprises a photodetector, for example a photodiode, which detects these photons and converts them into electric charge which is collected by a collection electrode. One speaks of an indirect-conversion detector since the charge collected by the collection electrodes does not arise directly from the interaction of the incident radiation in the detector material, but arises from the detection of the visible photons generated during the interaction.

Photon imagers, and in particular X-ray or γ-ray photon imagers, comprise a (semi-conductor or scintillator) detector material, coupled to pixels, the latter generally being disposed according to a matrix. The amount of charge collected by each pixel gives information on the location of the interaction as well as on the energy of the photons that have interacted in the detector.

Now, each interaction generates a large number of particles (photons in the scintillator case, electron-hole pairs in the case of a semi-conductor), which undergo a spatial dispersion in the detector material, and migrate toward various adjacent pixels.

The consequences of this dispersion are a degradation of spatial resolution, since several adjacent pixels are impacted, and a less precise estimation of the energy of the incident photon. One speaks of degradation of the resolution in energy.

To alleviate this problem, a solution has been proposed in U.S. Pat. No. 7,667,205. This solution consists in defining groups of pixels centered around a target pixel. Each group contains the target pixel and a few nearby pixels. A sum of output signals of each of the groups is calculated and these sums are compared by calculating differences between these sums. The group having the highest sum makes it possible to define the pixel that received the photon. Finally, the sum calculated for the group of this target pixel is assigned to the latter.

The applicants of the present patent application have realized that this solution exhibits a drawback. Indeed, the groups of two neighboring target pixels necessarily have common pixels. When comparing the sums of output signals of various neighboring groups, the values of the signals of the pixels in common cancel one another. The comparison may not take into account the pixel whose output signal is the strongest. This gives rise to inaccuracies in the location of the pixel that received the largest amount of signal. Additional steps are necessary to define the position of the interaction with more accuracy. Moreover, this gives rise to a large number of operations for processing the signals collected by each pixel, in particular the addition of the signals of the pixels of one and the same group, and then the subtraction of the signals of each group.

SUMMARY OF THE INVENTION

The invention is aimed at improving the location of an interaction in the detector and at improving the resolution in energy, by a simplified method, making it possible to minimize the number of operations to be implemented and at improving the reliability of the information assigned to the target pixel retained after comparison.

For this purpose, the subject of the invention is a method for processing signals collected by pixels of a detector, each pixel being able to collect a signal under the effect of radiation to which the detector is subjected, characterized in that it consists in:

identifying a pixel, termed the affected pixel, collecting a signal greater than a threshold, defining at least one adjacent pixel of the affected pixel, and, for each adjacent pixel:

selecting a first comparison group associated with said affected pixel and a second comparison group associated with said adjacent pixel, each comparison group comprising a plurality of pixels, said first and second comparison groups not comprising any pixel in common, determining a signal collected by each of the comparison groups, the signal collected by each of the comparison groups corresponding to a value representative of the signals collected by the various pixels of said group, comparing signals collected by each comparison group so as to determine the comparison group that has collected the most significant signal, declaring said affected pixel as winning pixel if the group associated with the affected pixel exhibits a collected signal greater than the signal collected by each group associated with an adjacent pixel of said affected pixel.

Each of the comparison groups is formed of pixels situated in the neighborhood of a given pixel, the given pixel being the affected pixel for the first comparison group and an adjacent pixel for the second comparison group associated with this adjacent pixel. The comparison groups are predetermined. Stated otherwise, each of the comparison groups comprises pixels organized according to a pattern. The patterns of the various groups are predetermined so as not to have pixels in common.

The threshold making it possible to identify the affected pixel is a predetermined threshold.

Advantageously, each comparison group comprises the same number of pixels.

The signal collected by a comparison group can in particular be a sum, weighted or not, of the signal generated by each pixel constituting said group. In the case of a weighted sum, each pixel of the comparison group can be assigned a weighting coefficient dependent on the distance between said pixel and the affected pixel.

In case of equality during a comparison, it is possible to use a predefined priority rule, to arbitrarily define the comparison group that has accumulated the most significant amount of signal from among the comparison groups that have participated in the comparison.

According to one embodiment, the comparison groups are organized according to a pattern of pixels and, for two given distinct pixels, the pattern of their comparison group varies as a function of the relative orientation of the two pixels.

It is then possible to allocate, to the winning pixel, a signal value dependent on the values of signal collected by the pixels of a group of pixels called the allocation group, the pixels of the allocation group comprising adjacent pixels of the winning pixel.

This allocation group can be identical to the comparison group associated with the winning pixel. It is also possible to include in the allocation group a group of adjacent pixels of the winning pixel.

The signal generated by the allocation group can be a sum, weighted or not, of the signals generated by each pixel constituting said allocation group. In the case of a weighted sum, each pixel of the allocation group can be assigned a weighting coefficient dependent on the distance between said pixel and the winning pixel.

The allocation group can comprise more or fewer pixels than the comparison group.

BRIEF DESCRIPTION OF THE DRAWINGS

The invention will be better understood and other advantages will become apparent on reading the detailed description of an embodiment given by way of example, description illustrated by the attached drawing in which.

For the sake of clarity, the same elements will bear the same tags in the various figures.

DETAILED DESCRIPTION

The invention is described in relation to a detector of ionizing radiation, in particular X-ray or gamma-ray radiation, in which a sensor is associated with a scintillator. It is also possible to implement the invention in a detector of semi-conductor type. In a more general manner, the invention can be implemented in any detector possessing discrete sensitive elements organized as a matrix, the detector being able to detect a physical phenomenon that one wishes to detect and locate. The invention exhibits interest when the physical phenomenon undergoes a spatial dispersion and may impact several neighboring sensitive elements.

Figure 1:
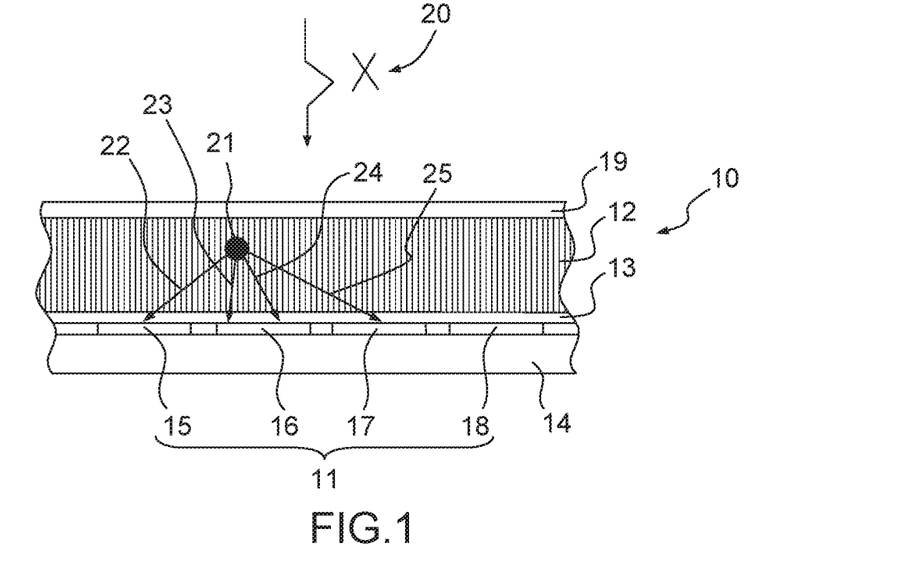
FIG. 1 represents an example of solid-state radiation detector.

FIG. 1 schematically represents in section an example of solid-state radiation detector 10 comprising a solid-state photosensitive sensor 11 associated with a scintillator 12. The sensor 11 and the scintillator 12 are fixed together with the aid of glue 13 which also effects optical coupling. The sensor 11 comprises, on an insulating substrate 14, pixels $P_i$ generally consisting of photosensitive elements, of photodiode, phototransistor or photoresistor type. In the example represented, four pixels 15, 16, 17 and 18 are represented. Of course a detector according to the invention can comprise a large number of photosensitive elements. The scintillator 12 is covered by an entrance window 19.

The detector 10 is subjected to X-ray radiation 20 passing through the entrance window 19 so as to reach the scintillator 12 whose function is to convert the X-ray radiation into a secondary radiation of larger wavelength and that can be detected by the photosensitive elements. The secondary radiation is for example visible or near-visible radiation. An X-ray photon 21 arising from the radiation 20 is represented in the scintillator 12 which absorbs the photon 21 and emits several secondary photons in response. In practice a single X-ray photon can generate a few hundred to a few thousand visible photons. In FIG. 1, by way of example, four visible photons 22, 23, 24 and 25 are represented. Photon 22 reaches pixel 15, photons 23 and 24 reach pixel 16, and photon 25 reaches pixel 17.

The invention makes it possible to accurately determine the pixel that received the largest number of visible photons, in this instance the pixel 16, while minimizing the signal processing operations. Geometrically, the X-ray photon 21 is situated above the pixel 16. The pixel 16 therefore makes it possible to locate the position of the X-ray photon 21. Moreover, the invention makes it possible to determine the energy of the X-ray photon 21 by counting the total number of visible photons arising from the X-ray photon 21.

Such a detector can operate in counting mode, and preferably for applications of spectrometry type, for which one is interested not only in the place of the interaction, but also in the amplitude of the signal collected by the pixels of the detector.

Figure 2:
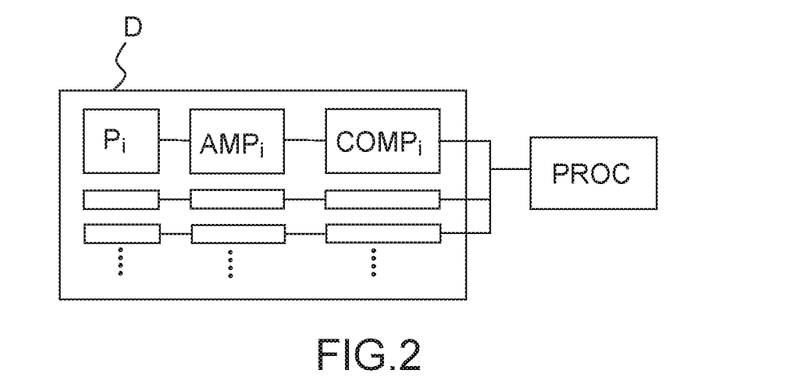
FIG. 2 electrically represents the radiation detector components.

FIG. 2 presents an exemplary electrical diagram of a detector.

When a pixel $P_i$ of a detector D collects electric charge, the reading circuit $AMP_i$ shapes the signal, generating a pulse whose amplitude depends on the collected charge. When this pulse exceeds a predetermined threshold $S_i$, the signal of the pixel is transmitted to a processing circuit PROC, for the implementation of the method which is the subject of the invention, and described hereinbelow. The comparison of the signal generated by the pixel with respect to the threshold $S_i$ is carried out by an amplitude discriminator $COMP_i$ integrated into the pixel.

The processing circuit PROC can be a circuit sited off-board the detector D, processing signals in digital form. Alternatively, it can also be integrated into the detector D, each pixel $P_i$ being able for example to comprise an elementary processing circuit $PROC_i$.

As was seen previously the particles released in the detector during the interaction of an X-ray photon may be detected by several pixels $P_i$ adjacent to the detector 10. The method according to the invention is aimed at accurately identifying the pixel closest to the interaction in the detector, while minimizing the number of calculations to be implemented. This in particular makes it possible to reduce the processing time as well as the consumption of the detector.

Accordingly, with each pixel $P_i$ of the detector is associated a group of pixels, termed the comparison group $C_i$. Each of the comparison groups $C_i$ is formed of pixels situated in the neighborhood of a given pixel. Each pixel, associated with a comparison group, forms a candidate center of impact. The object of the processing which follows is to determine the real center of impact from among the candidate centers of impact. This determination is done by comparing the signals collected by various comparison groups with the comparison group associated with the pixel. The various compared groups are associated with adjacent pixels. According to the invention, each comparison group associated with two adjacent pixels does not comprise any pixel in common.

When a pixel $P_0$, termed the affected pixel, collects an appreciable signal, that is to say a signal greater than a predetermined threshold S, the processing circuit PROC undertakes the following operations:

determination of the signal collected in a comparison group $C_0$ associated with the affected pixel $P_0$, determination of the adjacent pixels $P_1$ to $P_N$ of said affected pixel $P_0$, determination of the signal collected in the comparison group $C_1$ to $C_N$ associated with each adjacent pixel $P_1$ to $P_N$ of the affected pixel $P_0$, comparison of the signal collected in the comparison group $C_0$ associated with the pixel $P_0$ with the signal collected in the comparison group $C_1$ to $C_N$ associated with each adjacent pixel $P_1$ to $P_N$.

An affected pixel $P_0$ is declared "winning pixel" if the comparison group $C_0$ with which it is associated gathers a higher signal than that gathered in the comparison groups $C_1$ to $C_N$ associated with each of the pixels $P_1$ to $P_N$ which are adjacent to it.

If at least one comparison group $C_1$ to $C_N$ associated with an adjacent pixel of the affected pixel $P_0$ gathers more signal than the comparison group $C_0$, the affected pixel $P_0$ is not declared "winning pixel".

In the course of an interaction, several pixels may simultaneously collect a signal greater than the threshold S. The method described hereinabove is preferably implemented for each affected pixel subsequent to an interaction in the detector.

Adjacent pixels is intended to mean the N pixels nearest to the pixel $P_0$, N being an integer greater than or equal to 2. These may be the 4 nearest neighbors (N=4) or the 6 nearest neighbors (N=6), or indeed more. The value N depends in particular on the size of the pixels. It is understood that the smaller this size, the more liable an interaction is to generate an appreciable signal in a large number of adjacent pixels.

Signal collected by a comparison group is intended to mean a value representative of the signal collected by the various pixels making up this group. This may in particular be the sum of the signals collected by the various pixels making up the group. Other modes of determining the representative value can be implemented. It is for example possible to weight the value of the signal emitted by each of the pixels of the group.

The threshold $S_i$, beyond which it is considered that the pixel $P_i$ has collected a signal, can be a value determined experimentally in the course of preliminary trials, of an arbitrarily established value or of a value determined during a calibration phase, during which the detector is not exposed to radiation. This value can be identical for each pixel or can be a value $S_i$ associated with each pixel $P_i$.

In case of equality during the comparison, it is possible to use a predefined priority rule, to arbitrarily define the comparison group that has accumulated the most significant amount of signal from among the comparison groups that have participated in the comparison. The center of impact is for example defined as the pixel whose rank, row-wise or column-wise, is the lowest. More precisely, if a comparison between two pixels of one and the same row leads to an equality, it is possible to favor the one whose row number is the lower. Likewise during a comparison of two pixels of one and the same column leading to an equality, it is possible to favor the one whose column number is the lower.

A significant characteristic of the invention is that the groups associated with two adjacent pixels to carry out the comparison do not comprise any pixel in common. This decreases the number of calculations to be carried out during the comparison. This results in a decrease in the electrical consumption of the device. Moreover, this can make it possible to improve the reliability of locating the interaction. A simple example makes it possible to understand this advantage. In each of the groups, it is possible to calculate a sum of the values of the signals collected by each of the pixels of the group considered. The comparison of the signals collected by each of the groups can be done by comparing the sums of the various groups. The group having the most significant sum is that which has accumulated the most significant amount of signal. The comparison between the group $C_0$ associated with the affected pixel and each group Ci (1≤i≤N) associated with the N adjacent pixels, Ci (1≤i≤N) is easily done by subtraction of the sums and comparison of the result of the subtraction. If two compared groups comprise one or more pixels in common, the weights of the pixels common to the two groups cancel one another during the subtraction. If on the contrary the compared groups do not comprise any pixel in common, the comparison of the two groups is performed on the basis of different pixels and the relevance of the result will only be better.

FIGS. 3a to 3e make it possible to illustrate an example of various groups of pixels that are compared so as to determine a center of impact.

To simplify the presentation, a matrix of five rows a, b, c, d, e and five columns 1, 2, 3, 4, 5 is considered. Once again, of course, real matrices generally possess a larger number of rows and columns. Five given pixels $P_0$, $P_1$, $P_2$, $P_3$ and $P_4$ are considered, whose coordinates in the matrix are respectively c3, b3, d3, c4 and c2. It is assumed that at an instant t, the pixel $P_0$ detects a signal greater than a threshold and becomes a so-called affected pixel. With each of the given pixels is associated a group comprising the given pixel and four other adjacent pixels disposed diagonally with respect to the given pixel. For example for the pixel $P_0$, the group $C_0$ which is associated therewith comprises the pixel $P_0$ and the pixels whose coordinates are b2, b4, d2 and d4. The group $C_0$ is represented in a matrix shown diagrammatically by horizontally hatched boxes in FIGS. 3a to 3e.

Figure 3A:
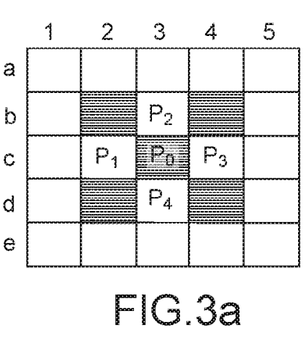
FIGS. 3a to 3e make it possible to illustrate an example of groups of pixels of the detector that are compared so as to determine a center of impact on the detector.
Figure 3B:
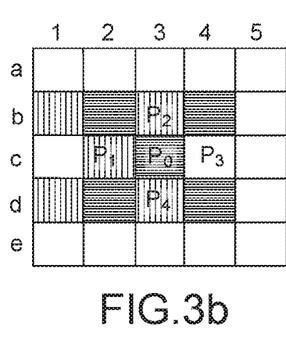
Figure 3C:
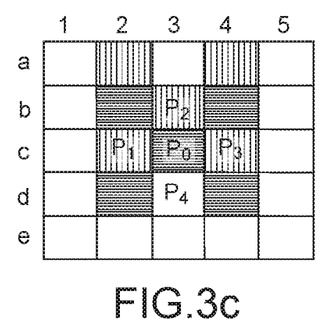
Figure 3D:
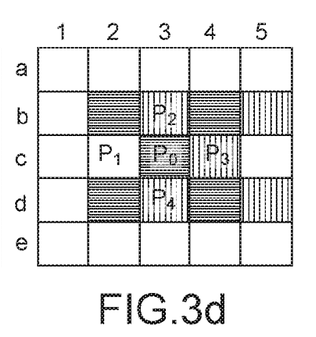
Figure 3E:
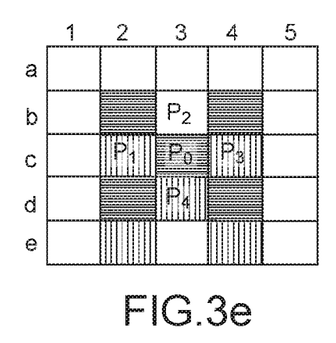

The geometric organization of the pixels of this group $C_0$ forms a pattern that can be displaced so as to define groups $C_1$ to $C_4$ associated with each of the adjacent pixels $P_1$, $P_2$, $P_3$ and $P_4$ of the pixel $P_0$. The group $C_0$ associated with the affected pixel $P_0$ and the group $C_1$ associated with the adjacent pixel $P_1$ are represented in FIG. 3b. The patterns of the two groups $C_0$, $C_1$ are chosen so as to prevent them from comprising pixels in common. In FIG. 3c has been represented another duplication of the matrix shown diagrammatically in which the groups $C_0$ and $C_2$ respectively associated with the affected pixel $P_0$ and with the adjacent pixel $P_2$ are represented. The groups $C_0$ and $C_3$ respectively associated with the affected pixel $P_0$ and with the adjacent pixel $P_3$ are represented in FIG. 3d and the groups $C_0$, $C_4$ associated with the affected pixel $P_0$ and with the adjacent pixel $P_4$ are represented in FIG. 3e. In FIGS. 3b to 3e, the groups $C_1$ to $C_4$ are represented by vertically hatched boxes.

For each group, the sum of the values of the signals of each of the pixels of the group considered is calculated. The sum corresponding to the group associated with the affected pixel $P_0$ is then compared, pairwise, with the sum corresponding to each adjacent group of the pixel $P_0$. More precisely, in the example represented, a comparison of the groups $C_0$ and $C_1$ respectively associated with the pixels $P_0$ and $P_1$ is illustrated in FIG. 3b. FIG. 3c illustrates the comparison of the groups $C_0$ and $C_2$ respectively associated with the pixels $P_0$ and $P_2$. FIG. 3d illustrates the comparison of the groups $C_0$ and $C_3$ respectively associated with the pixels $P_0$ and $P_3$. FIG. 3e illustrates the comparison of the groups $C_0$ and $C_4$ respectively associated with the pixels $P_0$ and $P_4$. Thus, one performs as much comparison as adjacent pixels, i.e. four comparisons. Only the groups not comprising any pixel in common are inter-compared.

In the example represented with the aid of FIGS. 3a to 3e several typical cases can arise as a function of the results of the various comparisons. If the group associated with the affected pixel $P_0$ possesses a sum of value greater than each of the sums of values of the other four groups each associated with the adjacent pixels $P_1$, $P_2$, $P_3$, and $P_4$ then the affected pixel $P_0$ is declared the winning pixel. If on the contrary certain comparisons give the group associated with the affected pixel $P_0$ as having a sum of value greater than the values of groups associated with certain adjacent pixels and other comparisons give an inverse result, the pixel $P_0$ is not the winning pixel.

Stated otherwise, an affected pixel is declared as winning pixel if by comparing its comparison group with all the comparison groups associated with each of the pixels which are adjacent to it, all the results of the various comparisons give the affected pixel as having accumulated the most significant amount of signal. In this example two pixels are considered to be adjacent if they are immediate neighbors and if they are both situated in the same row or in the same column of the pixel matrix. By way of alternative, adjacency can be defined in a broader manner, for example by including immediately neighboring pixels situated on a diagonal of the matrix passing through the central pixel, or indeed neighbor pixels of the so-called immediately neighboring pixels.

Advantageously, the winning pixel is allocated a signal value dependent on the signal values of the pixels of a group of pixels situated in the neighborhood of the winning pixel. This pixel group is called the allocation group. It can be the comparison group associated with the winning pixel. This makes it possible to simplify the calculations and to reuse a sum calculation already performed. Alternatively, the allocation group differs from the comparison group associated with the winning pixel. Indeed, the pattern retained for the various comparison groups can comprise holes making it possible to avoid the pixels in common during the various comparisons. It is possible to include in the allocation group a larger number of pixels than the number of pixels of the various comparison groups. Of course the various comparison groups have the same number of pixels. In the example of FIGS. 3a to 3e, if the affected pixel $P_0$ is the winning pixel, the allocation group associated with the pixel $P_0$ can comprise all the pixels of the comparison group associated with the pixel $P_0$ as well as the pixels $P_1$, $P_2$, $P_3$ and $P_4$. The comparison groups possess 5 pixels and the allocation group possess 9 pixels in this case. The pattern and the dimensions, expressed in number of pixels, of the allocation group are defined experimentally so as to be representative of the scatter of the visible photons around a center of impact. The same holds for the patterns and the dimensions of the comparison groups.

The signal value allocated to the winning pixel can be the sum of the values of the signals of all the pixels of the allocation group. This sum can be a simple sum or possibly a weighted sum making it possible to take account of possible noise for the pixels of the allocation group that are furthest from the winning pixel.

FIGS. 4a to 4e make it possible to illustrate another example of comparison groups and of allocation group. As for FIGS. 3a to 3e, a matrix of five rows a, b, c, d, e and five columns 1, 2, 3, 4, 5 is considered. The particular feature of the comparison groups of this example is that they do not comprise the pixel with which they are associated. For example, the group associated with the affected pixel $P_0$ comprises only the adjacent pixels $P_1$, $P_2$, $P_3$ and $P_4$ and not the affected pixel $P_0$. This comparison group is visible in FIGS. 4b to 4e. As previously, the pattern of the various comparison groups remains identical whatever the associated pixel. For example, the comparison group $C_1$ associated with the adjacent pixel $P_1$ is visible in FIG. 4b and comprises the pixels c1, b2, c3 and d2. The same holds for the comparison group $C_2$ associated with the adjacent pixel $P_2$ visible in FIG. 4c, for the comparison group $C_3$ associated with the adjacent pixel $P_3$ visible in FIG. 4d and for the comparison group $C_4$ associated with the adjacent pixel $P_4$ visible in FIG. 4e.

Figure 4A:
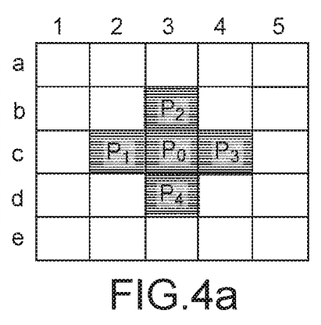
FIGS. 4a to 4e make it possible to illustrate another example of groups of pixels.
Figure 4B:
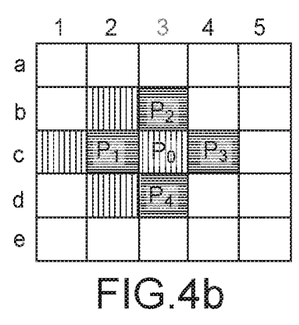
Figure 4C:
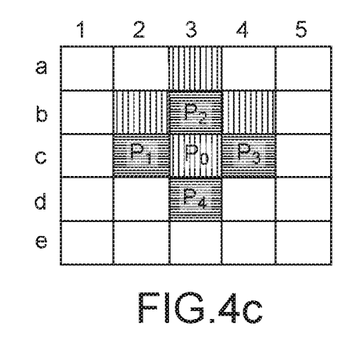
Figure 4D:
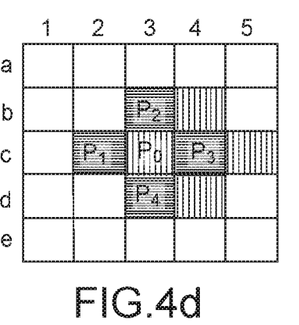
Figure 4E:
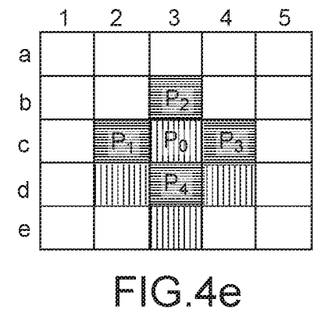

As previously, only the groups not comprising any pixel in common are inter-compared. In the example represented in FIGS. 4a to 4e, the comparison between the group $C_0$ associated with the affected pixel $P_0$ and the group $C_1$ associated with the adjacent pixel $P_1$ is represented in FIG. 4b, the comparison between the group $C_0$ associated with the pixel $P_0$ and the group $C_2$ associated with the adjacent pixel $P_2$ is represented in FIG. 4c, the comparison between the group $C_0$ associated with the affected pixel $P_0$ and the group $C_3$ associated with the adjacent pixel $P_3$ is represented in FIG. 4d and the comparison between the group $C_0$ associated with the affected pixel $P_0$ and the group $C_4$ associated with the adjacent pixel $P_4$ is represented in FIG. 4e.

Assuming that the result of the four comparisons gives the affected pixel $P_0$ as winner, the allocation group associated with the pixel $P_0$ comprises all the pixels of the comparison group associated with the pixel $P_0$, plus the pixel $P_0$. This allocation group is represented in FIG. 4a.

FIGS. 5a to 5e make it possible to illustrate an example of formation of comparison groups with variable patterns. More precisely, the comparison groups are organized according to a pattern of pixels and for two given distinct pixels, the pattern of their group varies as a function of the relative orientation of the two given pixels.

Figure 5A:
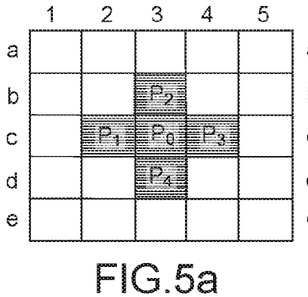
FIGS. 5a to 5e make it possible to illustrate an example of groups of pixels in which the pattern of the groups is variable.
Figure 5B:
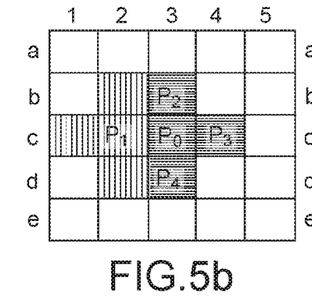

FIG. 5b represents two comparison groups, one associated with the affected pixel $P_0$ and the other with the adjacent pixel $P_1$. The group $C_0$ associated with the affected pixel $P_0$ comprises the pixels 3b, 3c, 3d and 4c. The group $C_1$ associated with the adjacent pixel $P_1$ comprises the pixels 1c, 2b, 2c and 2d.

Figure 5C:
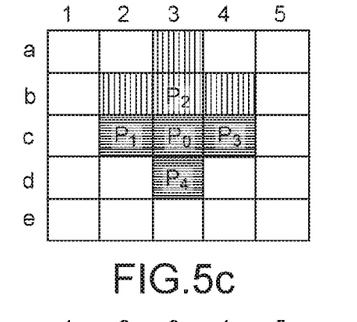

FIG. 5c represents two comparison groups, one associated with the affected pixel $P_0$ and the other with the adjacent pixel $P_2$. The group $C_0$ associated with the pixel $P_0$ comprises the pixels 2c, 3c, 4c and 3d. The group $C_2$ associated with the adjacent pixel $P_2$ comprises the affected pixels 3a, 2b, 3b and 4b.

Figure 5D:
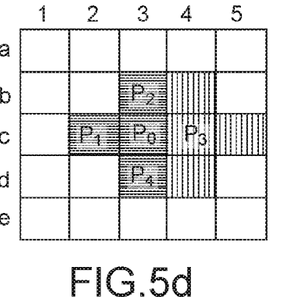

FIG. 5d represents two comparison groups, one associated with the affected pixel $P_0$ and the other with the adjacent pixel $P_3$. The group $C_0$ associated with the affected pixel $P_0$ comprises the pixels 2c, 3b, 3c and 3d. The group $C_3$ associated with the adjacent pixel $P_3$ comprises the pixels 4b, 4c, 4d and 5c.

Figure 5E:
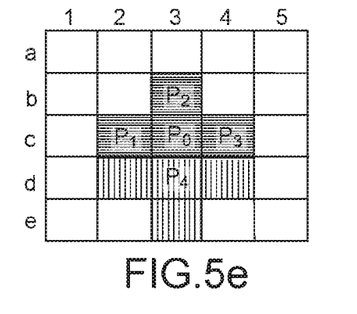

FIG. 5e represents two comparison groups, one associated with the affected pixel $P_0$ and the other with the adjacent pixel $P_4$. The group $C_0$ associated with the affected pixel $P_0$ comprises the pixels 3b, 2c, 3c and 4c. The group $C_4$ associated with the adjacent pixel $P_4$ comprises the pixels 2d, 3d, 4d and 3e.

In the comparisons represented in FIGS. 5b, 5c, 5d and 5e, the groups compared $C_0$ and $C_i$ ($1 \leq i \leq N=4$) pairwise, do not have any pixel in common.

Assuming that the result of the four comparisons gives the affected pixel $P_0$ as winner, the allocation group associated with the pixel X and represented in FIG. 5a comprises the pixels 2c, 3b, 3c, 3d and 4c. As in the example of FIGS. 4a to 4e, the allocation group represented in FIG. 5a comprises a larger number of pixels than the various comparison groups associated with the pixel $P_0$.

FIGS. 6a to 6e make it possible to illustrate another example of formation of comparison groups with variable patterns, in which we limit the calculations during the aggregation carried out to determine the signal value assigned to the winning pixel. More precisely, use is made of the signal values of the comparison groups that have contributed to determining the winning pixel in the allocation of signal value to the winning pixel. Stated otherwise, to determine the signal value allocated to the winning pixel, the need to return to the individual values of the various pixels of the allocation group is reduced and the sums already calculated for the comparison groups are reused. This makes it possible to limit the calculations by reusing for the allocation calculations already done during the comparison step.

Figure 6A:
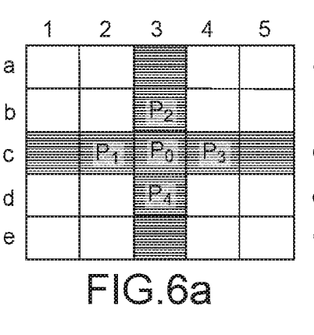
FIGS. 6a to 6e make it possible to illustrate another example of groups of pixels in which the pattern of the groups is variable
Figure 6B:
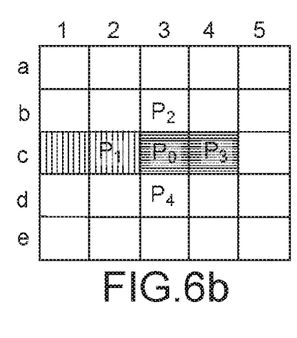

FIG. 6b represents two comparison groups, one associated with the affected pixel $P_0$ and the other with the adjacent pixel $P_1$. The group $C_0$ associated with the affected pixel $P_0$ comprises the pixels 3c and 4c. The group $C_1$ associated with the adjacent pixel $P_1$ comprises the pixels 1c and 2c.

Figure 6C:
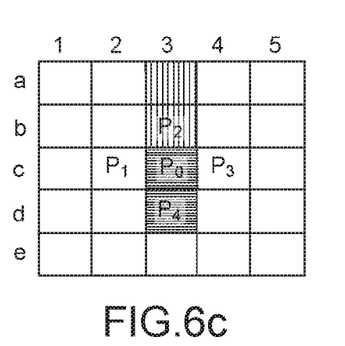

FIG. 6c represents two comparison groups, one associated with the affected pixel $P_0$ and the other with the adjacent pixel $P_2$. The group $C_0$ associated with the affected pixel $P_0$ comprises the pixels 3c and 3d. The group $C_2$ associated with the adjacent pixel $P_2$ comprises the pixels 3a and 3b.

Figure 6D:
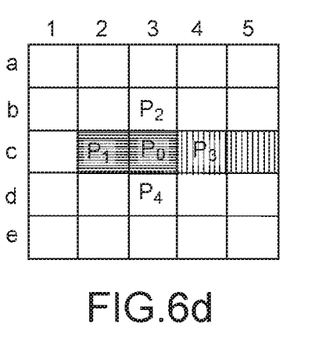

FIG. 6d represents two comparison groups, one associated with the affected pixel $P_0$ and the other with the adjacent pixel $P_3$. The group $C_0$ associated with the affected pixel $P_0$ comprises the pixels 2c and 3c. The group $C_3$ associated with the pixel $P_3$ comprises the pixels 4c and 5c.

Figure 6E:
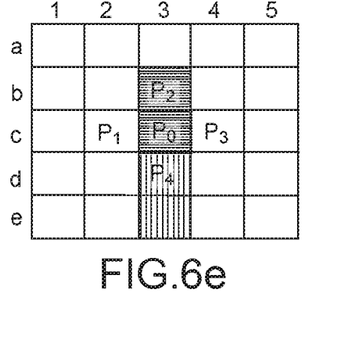

FIG. 6e represents two comparison groups, one associated with the affected pixel $P_0$ and the other with the adjacent pixel $P_4$. The group $C_0$ associated with the affected pixel $P_0$ comprises the pixels 3b and 3c. The group $C_4$ associated with the adjacent pixel $P_4$ comprises the pixels 3d and 3e.

As previously, the comparisons represented in FIGS. 6b, 6c, 6d and 6e, the groups compared $C_i$ ($1 \leq i \leq N=4$) do not have any pixel in common with the group $C_0$ associated with the pixel $P_0$.

Assuming that the result of the four comparisons gives the pixel $P_0$ as winning pixel, the allocation group, associated with the pixel $P_0$ and represented in FIG. 6a, comprises the pixels 1c, 2c, 3a, 3b, 3c, 3d, 3e, 4c and 4d. The allocation group represented in FIG. 6a comprises a larger number of pixels than the various comparison groups associated with the winning pixel $P_0$. To determine the signal value allocated to the winning pixel, the sum of the signal values of the losing comparison groups is computed, that is to say the comparison groups associated with the pixels $P_1$, $P_2$, $P_3$ and $P_4$. To this sum is added the signal value of the winning pixel $P_0$. Thus, by adding together 5 values, the aggregate sum of the signals of the 9 pixels of the allocation group is obtained.

Figure 7A:
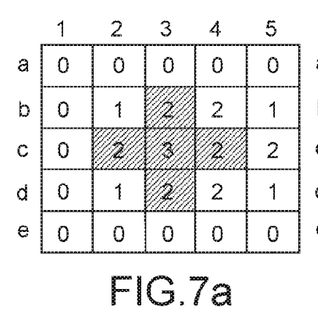
FIGS. 7a to 7c and FIGS. 8a and 8b illustrate an advantage of the invention.
Figure 7B:
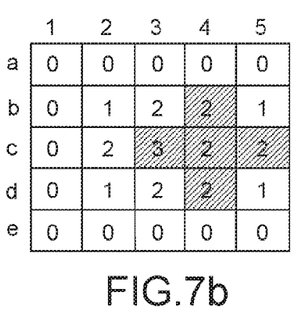
Figure 7C:
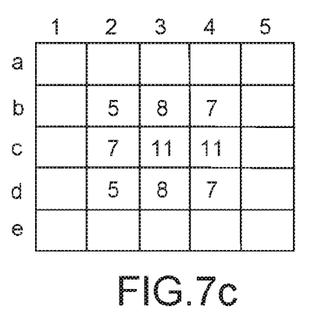

FIGS. 7a, 7b, 7c, 8a and 8b make it possible to illustrate an advantage obtained by virtue of the invention. As previously, a matrix of five rows a, b, c, d, e and of five columns 1, 2, 3, 4, 5 is considered. For each pixel of the matrix, in FIGS. 7a, 7b and 8a an amount of recorded signal has been indicated for each pixel. For the sake of simplification, this amount is expressed by integer numbers. The matrices of the three FIGS. 7a, 7b and 8a receive the same amounts of signal. The difference between these three matrices resides in the comparison groups chosen. The comparison groups represented in FIGS. 7a and 7b do not implement the invention. In FIG. 7a, the comparison group associated with the pixel c3 comprises the pixels b3, c2, c3, c4 and d3. In FIG. 7b, the comparison group associated with the pixel c4 comprises the pixels b4, c3, c4, c5 and d4. These two groups possess pixels in common: c3 and c4. The aggregate amount of signal in each comparison group is represented in FIG. 7c. For the two groups associated with the pixels c3 and c4, the aggregate sum is equal to 11. There is therefore an indeterminacy. It is not possible to determine the winning pixel. For the record, we have also noted the sums of comparison groups of like form for the pixels b2, b3, b4, c2, d2, d3 and d4.

Figure 8A:
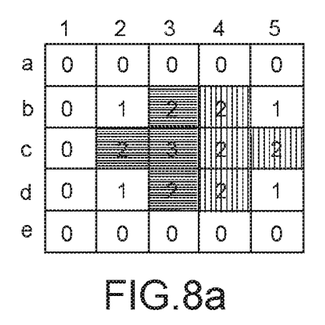
Figure 8B:
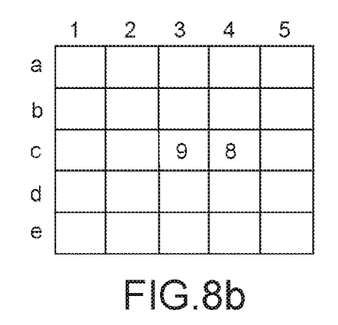

FIG. 8a represents comparison groups in accordance with the invention and respectively associated with the pixels c3 and c4, according to the examples represented in FIG. 5b. More precisely, the comparison group associated with the pixel c3 comprises the pixels b3, c2, c3 and d3. The comparison group associated with the pixel c4 comprises the pixels b4, c5, c4 and d4. The aggregate amount of signal in each comparison group is represented in FIG. 8b. For the group associated with the pixel c3, the aggregate sum is equal to 9 and for the group associated with the pixel c4, the aggregate sum is equal to 8. Here it is possible to determine that the pixel c3 is the winning pixel.

The example illustrated with the aid of FIGS. 8a and 8b shows that choosing comparison groups not comprising any pixel in common allows more reliable determination of the winning pixel. But this pixel represents the most probable position of the interaction in the detector 10. It is understood therefore that the invention makes it possible to improve the spatial resolution of the detector.

The invention claimed is:

1. A method of determining the location of an interaction of radiation with a photon detector, comprising the steps of:
   collecting a signal in an affected pixel of the photon detector, the signal being dependent on the level of radiation to which the affected pixel is subjected,
   selecting the affected pixel of the photon detector for comparison if the collected signal is greater than a threshold,
   aggregating a comparison group of pixels for the affected pixel,
   allocating a signal value representative of collected signals of the affected pixel comparison group using a processing circuit associated with the photon detector,
   selecting at least one adjacent pixel of the affected pixel, and, for the at least one adjacent pixel:
   aggregating a comparison group of pixels associated with each of said at least one adjacent pixel, said at least one adjacent pixel comparison group comprising a plurality of pixels, and, there being no pixel in common among said affected pixel comparison group and said at least one adjacent pixel comparison group, and
   allocating a signal value representative of collected signals of the plurality of pixels for the at least one adjacent pixel comparison group using the processing circuit associated with the photon detector,
   comparing the allocated signal values of the affected pixel comparison group and the at least one adjacent pixel comparison group, so as to determine the comparison group that has the highest allocated signal value, and
   identifying the affected pixel as the most probable position of the interaction of the radiation with the photon detector if the affected pixel comparison group exhibits an allocated signal value greater than the allocated signal value for the at least one adjacent pixel comparison group to determine the special resolution of the interaction of the radiation with the photon detector.

2. The method as claimed in claim 1, wherein the allocated signal value for each comparison group corresponds to the sum of the signals collected by the pixels constituting said group.

3. The method as claimed in claim 1, wherein in case of equality during the comparison, a priority rule is used to arbitrarily define the comparison group that has accumulated the highest allocated signal value from among the comparison groups that have participated in the comparison.

4. The method as claimed in claim 1, wherein the comparison groups are organized according to a pattern of pixels and wherein, for two given distinct pixels, the pattern of their comparison group varies as a function of the relative orientation of the two given pixels.

5. The method as claimed in claim 1, wherein each comparison group comprises the same number of pixels.

6. The method as claimed in claim 1, comprising allocating to the affected pixel, a signal value dependent on the signal values of the pixels of a group of pixels called the allocation group if the affected pixel is identified as the most probable position of interaction of a photon with the photon detector, the pixels of the allocation group comprising adjacent pixels of the affected pixel.

7. The method as claimed in claim 6, wherein the allocation group is the comparison group associated with the affected pixel.

8. The method as claimed in claim 6, wherein the allocation group is different from the comparison group associated with said affected pixel.

9. The method as claimed in claim 8, wherein the allocation group comprises a larger number of pixels than the comparison group associated with the affected pixel.

10. The method as claimed in claim 8, wherein use is made of the signal values of the comparison groups that have contributed to identifying the affected pixel as the most probable position of interaction of a photon with the photon detector for the allocation of signal value to the affected pixel.

* * * * *